US009075601B1

(12) United States Patent
Hucik et al.

(10) Patent No.: US 9,075,601 B1
(45) Date of Patent: Jul. 7, 2015

(54) PROVIDING A SCRIPTING INTERFACE TO EXISTING CODE

(71) Applicant: CA, Inc., Islandia, NY (US)

(72) Inventors: Robert Hucik, Simi Valley, CA (US); Beau Croteau, Bay Shore, NY (US); Liam Irish, Tampa, FL (US); Joshua Abrams, Clearwater, FL (US)

(73) Assignee: CA, Inc., New York, NY (US)

( * ) Notice: Subject to any disclaimer, the term of this patent is extended or adjusted under 35 U.S.C. 154(b) by 27 days.

(21) Appl. No.: 13/788,762

(22) Filed: Mar. 7, 2013

(51) Int. Cl.
G06F 9/44 (2006.01)
G06F 17/30 (2006.01)

(52) U.S. Cl.
CPC .. *G06F 8/31* (2013.01); *G06F 9/44* (2013.01); *G06F 17/30* (2013.01)

(58) Field of Classification Search
CPC ............. G06F 9/44; G06F 17/30; G06F 8/31
See application file for complete search history.

(56) References Cited

U.S. PATENT DOCUMENTS

| 6,502,099 | B1 * | 12/2002 | Rampy | 1/1 |
| 6,609,158 | B1 * | 8/2003 | Nevarez et al. | 719/316 |
| 6,662,358 | B1 * | 12/2003 | Berry et al. | 717/128 |
| 7,464,297 | B2 * | 12/2008 | Potter et al. | 714/38.14 |
| 8,726,228 | B2 * | 5/2014 | Ravindran et al. | 717/105 |
| 8,739,163 | B2 * | 5/2014 | Ceze et al. | 718/100 |
| 8,793,651 | B2 * | 7/2014 | Jin Eo et al. | 717/115 |
| 8,959,477 | B2 * | 2/2015 | Mueller | 717/106 |
| 2007/0288886 | A1 | 12/2007 | Mensch et al. | |
| 2008/0092129 | A1 * | 4/2008 | Prakash et al. | 717/162 |
| 2008/0120348 | A1 * | 5/2008 | Field et al. | 707/201 |
| 2008/0244509 | A1 * | 10/2008 | Buchs et al. | 717/106 |
| 2009/0119642 | A1 * | 5/2009 | Brendle et al. | 717/116 |
| 2009/0172653 | A1 * | 7/2009 | Elliott | 717/148 |
| 2009/0240935 | A1 * | 9/2009 | Shukla | 713/100 |
| 2011/0265164 | A1 * | 10/2011 | Lucovsky et al. | 726/7 |
| 2011/0302267 | A1 * | 12/2011 | Christensen | 709/217 |
| 2012/0216219 | A1 * | 8/2012 | Sharma et al. | 719/331 |
| 2012/0291005 | A1 * | 11/2012 | Quine | 717/105 |
| 2013/0263023 | A1 * | 10/2013 | Goodwin et al. | 715/760 |
| 2013/0283252 | A1 * | 10/2013 | Mannarswamy et al. | 717/168 |
| 2014/0089901 | A1 * | 3/2014 | Hadar | 717/127 |

OTHER PUBLICATIONS

Oscar Nierstrasz et al. "Component-Oriented Software Development", [Online], 1992, pp. 1-5, [Retrieved from Internet on Mar. 19, 2015], <http://citeseerx.ist.psu.edu/viewdoc/download?doi=10.1.1.85.4062&rep=rep1&type=pdf>.*

(Continued)

*Primary Examiner* — Thuy Dao
*Assistant Examiner* — Ziaul A Chowdhury
(74) *Attorney, Agent, or Firm* — Myers Bigel Sibley & Sajovec, P.A.

(57) ABSTRACT

To communicate with a software application, internal data of the software application is exposed or otherwise made accessible responsive to injection of computer readable program code comprising a scripting engine into a runtime environment associated with the software application. Computer readable program code comprising a script in accordance with the internal data is loaded. The script is interpretable by the scripting engine for execution with existing code of the software application to alter operation thereof without modification of the existing code. Related methods, systems, and computer program products are also discussed.

24 Claims, 5 Drawing Sheets

(56) References Cited

OTHER PUBLICATIONS

Sune R. Bahn et al., "An Object-Oriented Scripting Inteface to a Legacy Electronic Structure Code", [Online], 2002, pp. 56-66, [Retrieved from Internet on Mar. 19, 2015], <http://orbit.dtu.dk/fedora/objects/orbit:18677/datastreams/file_4269120/content>.*

Henry Lieberman, "Integrating user interface agents with conventional applications",[Online], 1998, pp. 15-23, [Retrieved from Internet on Mar. 19, 2015], <http://citeseerx.ist.psu.edu/viewdoc/download?doi=10.1.1.106.6727&rep=rep1&type=pdf>.*

Olof Hellman et al., "Application software for data analysis for three-dimensional atom probe microscopy", [Online], 2002, pp. 29-33, [Retrived from Internet on Mar. 19, 2015], <http://ac.els-cdn.com/S0921509301018871/1-s2.0-S0921509301018871-main.pdf>.*

Chaur Wu, "Build your own script language for Java. An introduction to JSR 223", Javaworld, Apr. 24, 2006, http://www.javaworld.com/javaworld/jw-04-2006/jw-0424-scripting.html accessed Dec. 10, 2012, 9 pages.

* cited by examiner

PROVIDING A SCRIPTING INTERFACE TO EXISTING CODE

BACKGROUND

The present disclosure relates to computing systems, and methods of interfacing with computing systems.

Virtualized computing environments, also referred to as cloud computing systems or composite information technology systems, are used to provide computing resources to end users. In a cloud computing environment, the physical hardware configuration is hidden from the end user. Cloud computing systems may include servers, network storage devices, routers, gateways, communication links, software (e.g., applications, operating systems, web services, etc.), and other devices. However, because the physical hardware and software platforms on which cloud computing system is implemented are hidden within a "cloud," they can be managed, upgraded, replaced or otherwise changed by a system administrator without the customer being aware of or affected by the change.

In a typical cloud computing environment, applications may be executed on virtual machines or appliances, which are guest operating systems installed within a host system and an optional preset configuration and structure (e.g., combination of operating system and web server). A virtual machine (VM) can be a software implementation of a machine or computer that executes programs as would a physical machine, in a manner that is transparent to a user. Virtual machines are typically implemented with software emulation and/or hardware virtualization. A single hardware and/or software platform may host a number of virtual machines, each of which may have access to some portion of the platform's resources, such as processing resources, storage resources, etc.

In any computing environment, interacting with already-existing code bases (for example, to integrate new functionality) can present challenges. In particular, it may be advantageous to integrate new code with existing code, without rewriting the existing code. In one such integration technique, an interface of an existing software component or application, such as a Simple Object Access Protocol (SOAP) interface, may be digested to discover and/or expose methods and application program interfaces (APIs) of the existing component. A developer may then write a connector (for example, in Java) to interact with the existing component.

BRIEF SUMMARY

Systems, methods and computer program products for communicating with existing computer readable program code are disclosed.

According to an embodiment described herein, in a method of communicating with a software application, internal data of the software application is exposed or otherwise made accessible responsive to injection of computer readable program code comprising a scripting engine into a runtime environment associated with the software application, and computer readable program code comprising a script in accordance with the internal data is loaded. The script is interpretable by the scripting engine for execution with existing code of the software application to alter operation thereof without modification of the existing code.

In an embodiment, the exposing may be independent of an interface of the software application. For example, access to the internal data may be provided using a hook in the existing code. Based on the internal data, a location in the existing code to insert the script may be determined, and the script may be inserted into the existing code at the determined location.

In an embodiment, the script may be based on a different programming language than that of the software application and/or the scripting engine. For example, the software application and the scripting engine may be based on a static and/or compiled programming language, and the script may be based on a dynamic and/or interpreted programming language. The script may be loaded for execution without mapping the computer readable program code of the script to the programming language of the software application.

In an embodiment, the script may be executed in a context of the existing code to provide one or more functionalities that are different from that provided by the software application.

In an embodiment, the execution of the script may provide a functionality to instrument a performance of the software application, trace execution of the existing code dynamically at runtime, determine an interaction of subroutines of the software application, and/or generate an analysis or suggestion regarding operation of the software application.

In an embodiment, the software application may be a first software application, and a second software application having the computer readable program code comprising the scripting engine injected into a runtime environment thereof may be discovered. An output or result of the execution may be provided to the second software application. For example, the output of the execution of the script may be a result of a native call in the existing code, and the result may be provided to the second software application. Additionally or alternatively, the output of the execution of the script may be an external call to the second software application, and the external call may be provided to the second software application.

In an embodiment, responsive to loading of the script, a file of the script may be updated to alter operation of the script without recompiling the software application.

In an embodiment, the software application may be hosted by a virtual machine, and the execution may include conversion of the scripting engine to machine-readable program code for execution by the virtual machine in a context of the existing code.

It is noted that aspects described with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
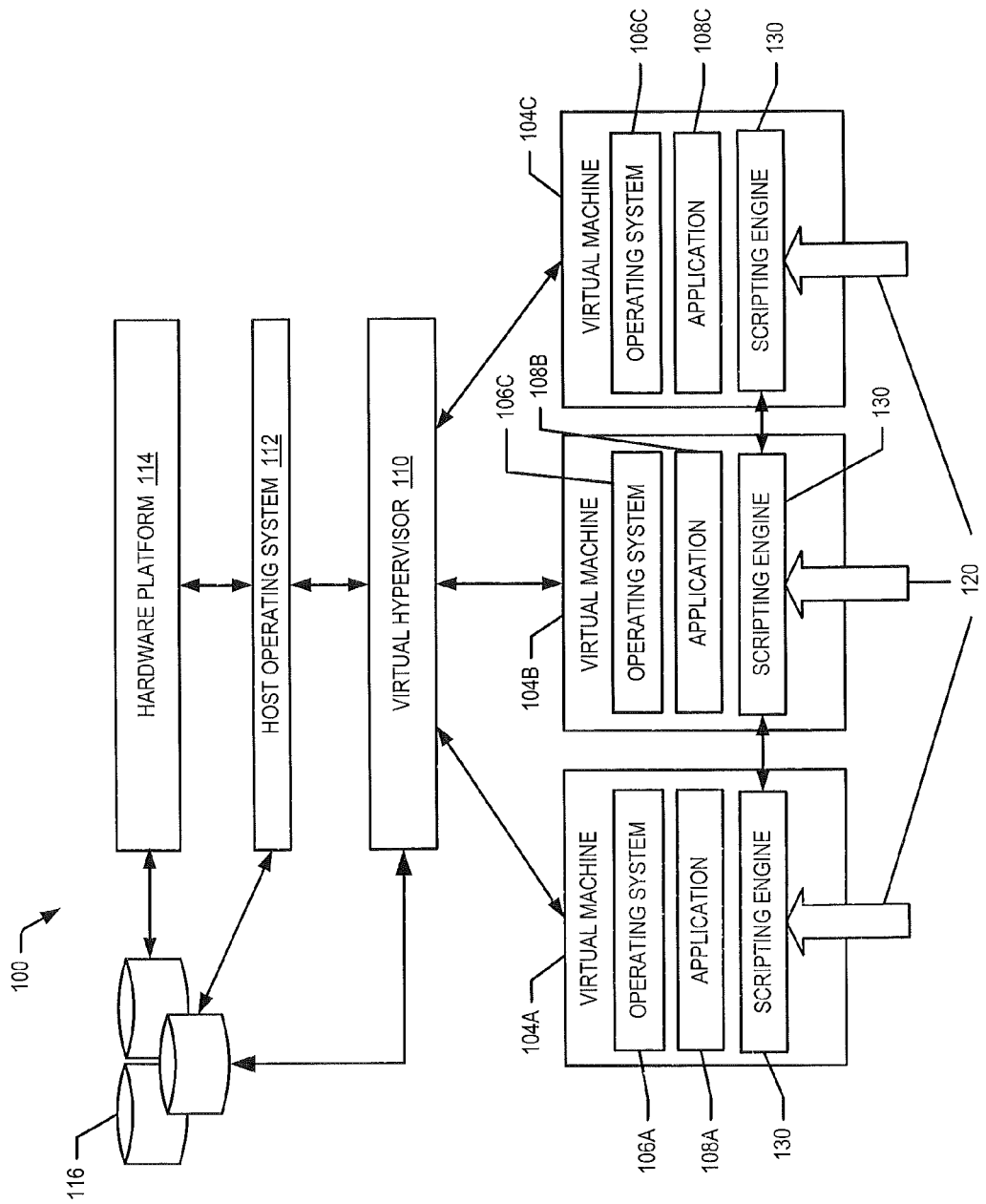
FIG. 1 is a block diagram illustrating a computing environment for communicating with an existing code base of a software application in accordance with an embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented as entirely hardware, entirely software (including firmware, resident software, micro-code, etc.) or by a combined software and hardware implementation that may all generally be referred to herein as a "circuit," "module," "component," "processor," or "system." Furthermore, aspects of the present disclosure may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing, Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as JavaScript, Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. Elements described as being "to" perform such functions/acts/operations may be configured to or otherwise structured to do so.

These computer program instructions may also be stored in a computer readable medium (such as a computer readable storage medium and/or a computer readable signal medium) that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Embodiments of the present disclosure will be described more fully hereinafter with reference to the accompanying drawings. Other embodiments may take many different forms and should not be construed as limited to the embodiments set forth herein. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Unless otherwise defined, all terms (including technical and scientific terms) used herein have the same meaning as commonly understood by one of ordinary skill in the art to which the present disclosure belongs. It will be further understood that terms used herein should be interpreted as having a meaning that is consistent with their meaning in the context of this specification and the relevant art and will not be interpreted in an idealized or overly formal sense unless expressly so defined herein.

As described herein, a computing environment may include one or more hosts, operating systems, peripherals, and/or applications. Machines (physical or virtual) in a same computing system or environment may have shared memory or resources, may be associated with the same or different hardware platforms, and/or may be located in the same or different physical locations. Computing environments described herein may refer to a virtualized environment (such as a cloud environment) and/or a physical environment.

As also described herein, a scripting engine refers to a computer readable program code that is configured to interpret and process or execute a script. The scripting engine may be an interpreter (for example, a JavaScript interpreter) that is written in a static programming language (for example, Java). A script refers to computer readable program code that is configured to be interpreted and/or executed by the scripting engine. The script may be written in dynamic programming language, which may refer to a high-level programming language that executes at runtime some behaviors that other languages, such as a static programming language, might perform during compilation. In contrast, the software application or environment in which the script may be executed may be written in a static or compiled language.

Some embodiments of the present disclosure arise from realization that digesting an interface of an existing software application for the purpose of writing connector code may be cumbersome, particularly with respect to the number of parties involved in the process. Also, the programming language of the software application may impose limits with respect to implementation of the connector code. For example, a connector for interacting with a software application based on a static or complied programming language may also be required to be implemented using the same programming language.

Accordingly, rather than using an interface of an existing software application, embodiments of the present disclosure inject a scripting engine (also referred to herein as the 'R2' solution) into a runtime environment associated with the existing software application. The scripting engine may automatically expose or provide access to the internal data (such as the underlying methods and/or application program interfaces) of the software application, allowing for the loading and execution of connectors written in a different programming language than that of the software application. For example, in some embodiments connectors may be scripts written in a dynamic scripting language (such as JavaScript), even where the software application is based on a static language (such as Java).

The scripting engine may thus allow programmatic access to computational objects within the software application, including methods thereof. The scripting engine may accomplish this by utilizing pre-existing hooks in the existing code, loading a script that is configured to perform a desired operation, and executing the script directly in the existing code. For example, for a Java-based application, the scripting engine may be injected into the Java runtime, and may provide access to all internal data that the Java subsystem exposes. As such, a developer may write connectors in JavaScript (rather than Java), and the connector may be loaded and executed by the scripting engine at runtime. The result may be interpreted and converted into Java bytecode for execution by a Java virtual machine (JVM) that is hosting the application in the context of the application's existing source code. As such, embodiments of the present disclosure can alter operation of the software application (for example, to provide new functionality) without modifying the existing code of the software application.

FIG. 1 illustrates a computer system 100 for a virtualized computing environment in which the subject matter of the present disclosure can be embodied. Although various embodiments are described in the context of a virtualized computing environment, the present disclosure is not limited thereto and may be used for interfacing with software components or applications in non-virtual computer environments. Referring now to FIG. 1, the computer system 100 generally hosts and manages one or more managed machines (illustrated as virtual machines 104A-104C), each of which runs a guest operating system 106A-106C and one or more software applications 108A-108C. The computing needs of users (e.g., humans and/or other virtual/non-virtual machines) may drive the functionality of the machines 104A-104C. A virtual hypervisor 110 can provide an interface between the machines 104A-104C and a host operating system 112 and allow multiple guest operating systems 106A-106C and associated applications 108A-108C to run concurrently. The host operating system 112 handles the operations of a hardware platform 114 capable of implementing the machines 104A-104C. A data storage space 116 may be accessed by the host operating system 112 and is connected to the hardware platform 114.

The hardware platform 114 generally refers to any computer system capable of implementing the machines 104A-104C, which may include, without limitation, a mainframe computer platform, personal computer, mobile computer (e.g., tablet computer), server, wireless communication terminal (e.g., cellular data terminal), or any other appropriate program code processing hardware. The hardware platform 114 may include computer resources such as a processing circuit(s) (e.g., central processing unit, CPU); networking controllers; communication controllers; a display unit; a program and data storage device; memory controllers; input devices (such as a keyboard, a mouse, etc.) and output devices such as printers. The processing hardware may include circuit(s) configured to execute computer program code from memory device(s), described below as a computer readable storage medium, to perform at least some of the operations and methods described herein, and may be any conventional processor circuit(s), such as the AMD Athlon™ 64, or Intel® Core™ Duo.

The hardware platform 114 may be further connected to the data storage space 116 through serial or parallel connections. The data storage space 116 may be any suitable device capable of storing computer-readable data and program code, and it may include logic in the form of software applications, random access memory (RAM), or read only memory (ROM), removable media, or any other suitable memory component. Although some embodiments of the computer system 100 can be configured to operate as a computer server, the computer system 100 is not limited thereto and can be configured to provide other functionality, such as data processing, communications routing, etc.

Besides acting as a host for computing applications that run on the hardware platform 114, the host operating system 112 may operate at the highest priority level in the system 100, executing instructions associated with the hardware platform 114, and it may have exclusive privileged access to the hardware platform 114. The priority and privileged access of hardware resources affords the host operating system 112 exclusive control over resources and instructions, and may preclude interference with the execution of different application programs or the operating system. The host operating system 112 can create an environment for implementing a virtual machine, hosting the "guest" virtual machines 104A-104C. One host operating system 112 is capable of implementing multiple isolated virtual machines simultaneously.

The virtual hypervisor 110 (which may also be known as a virtual machine monitor/manager or VMM) may run on the host operating system 112 and provides an interface between the machines 104A-104C and the hardware platform 114 through the host operating system 112. The hypervisor 110 virtualizes the computer system resources and facilitates the operation of the managed machines 104. The hypervisor 110 may provide the illusion of operating at the highest priority level to the guest operating systems 106A-106C. However, the virtual hypervisor 110 can map the guest operating system's priority level to a priority level lower than the top most priority level. As a result, the virtual hypervisor 110 can intercept the guest operating systems 106A-106C, and execute instructions that require virtualization assistance. Alternatively, the virtual hypervisor 110 may emulate or actually execute the instructions on behalf of the guest operating systems 106A-106C. Software steps permitting indirect interaction between the guest operating systems 106A-106C and the physical hardware platform 114 can also be performed by the virtual hypervisor 110.

When operating in a virtualized environment, the machines 104A-104C present a virtualized environment to the guest operating systems 106, which in turn provide an operating environment for applications 108 and other software constructs.

Still referring to FIG. 1, each of the machines 104A-104C also includes computer readable program code defining a scripting engine 130 that has been introduced into a runtime environment thereof by code injection 120. The injected scripting engine 130 provides a platform for scripting existing software applications, such as the applications 108A-108C, without modifying the existing code bases of the applications 108A-108C. The scripting engine 130 may be an interpreter written in a same programming language as one or more of the applications 108A-108C. For example, the scripting engine 130 can be injected into existing Java-based software applications 108A-108C, where there is no scripting environment, or to add an additional auxiliary scripting mechanism. Once injected, the scripting engine 130 can load and execute scripts to provide the existing applications 108A-108C with additional functionality. As such, the scripting engine 130 provides an umbrella approach whereby code injection and scripting can be used to change the behavior of the software applications 108A-108C to implement additional functionality that would not otherwise be provided thereby, and without modifying the existing code of the applications 108A-108C.

For example, the scripting engine may be configured to receive and load a script that provides the functionality to instrument existing code bases in one or more of the applications 108A-108C. Instrumenting can include, for example, feature enhancement and/or bug fixes. For example, the scripting engine 130 may be configured to load a script that, when executed, can instrument existing Java code and/or load native code via a native library loader. A full JavaScript runtime can be provided via a standard Java component, such as Rhino, providing enhanced flexibility. The scripting engine 130 may also be configured to receive and load a script to find and instrument existing objects in memory. Accordingly, the scripting engine 130 may allow users or developers to change the behavior of running applications or applications at load time, without modifying the actual source code of the host software 108A-108C.

The scripting engine 130 may be further configured to receive and load a script, that, when executed, can interrogate existing code bases. In particular, a script may be received that provides the functionality to trace existing code dynamically at runtime. This may allow a user or developer to determine the interaction of function calls, method calls, and/or inter-product communications via networks. In addition, using the results of the tracing, the scripting engine 130 may be configured to receive and load a script that performs automated analysis and make suggestions about integrations, performance problems and find potential bugs and suggest fixes.

Accordingly, injection of a scripting engine 130 as described herein can allow users/developers to script their own use of existing software applications 108A-108C. In some embodiments, the scripting engine 130 may also include its own JavaScript application program interface (API). In addition, the scripting engine 130 can also allow for a less powerful automated representational state transfer (REST) API generation, for example, for calls implemented within the JavaScript Evaluation environment for integration with other web technologies. In particular, capabilities of the scripting engine 130 described herein can include, but are not limited to: load-time instrumentation of existing Java based applications; runtime injection of scripting environment into Java based applications; full JavaScript evaluation environment based on Rhino; distributed node discovery via multicast domain name system (MDNS); dynamic Java code instrumentation; native library loader; JavaScript API; API tracing and call graph generation for products; raw REST API generation from call graphs; and automated analysis of call graphs to suggest integrations and fixes.

Although illustrated by way of example in FIG. 1 with respect to managed virtual machines 104 in a virtual computing environment, it will be understood that introduction of a scripting engine 130 into a computing environment using code injection 120 in accordance with embodiments of the present disclosure may be applied to managed machines in physical computing environments and/or cloud computing environments as well. Also, while illustrated in FIG. 1 with reference to specific functions performed by specific blocks, it will be understood that the functionality of blocks shown herein may be combined, divided, or eliminated.

Figure 2:
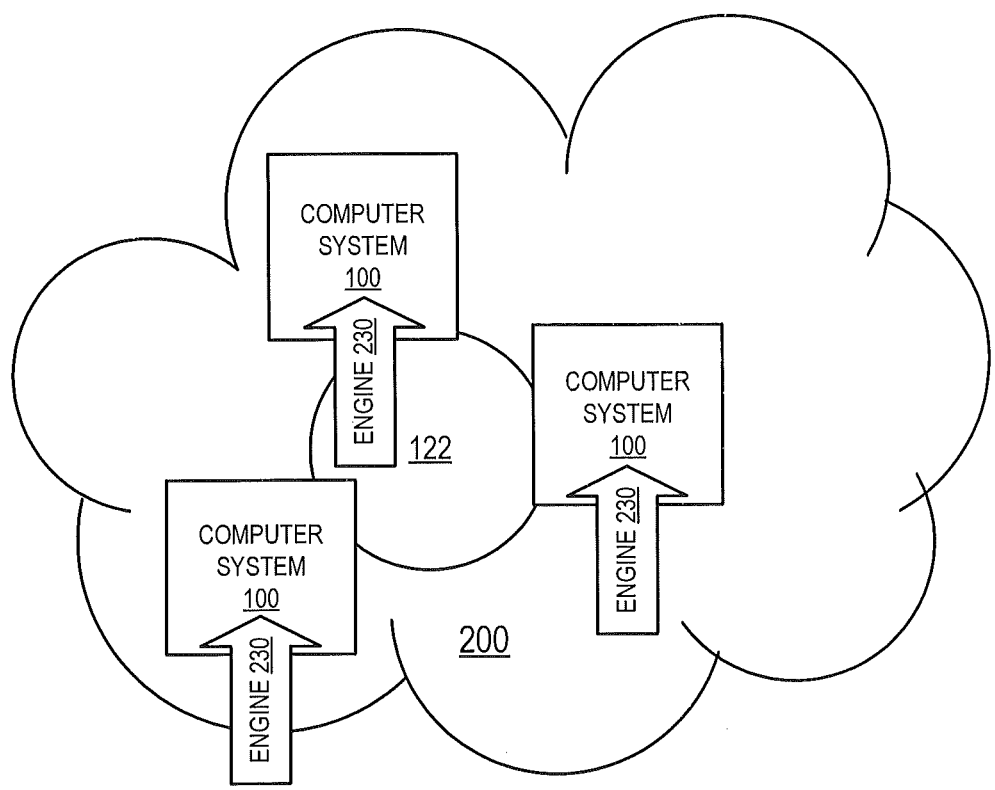
FIG. 2 is a block diagram illustrating a physical layout of a computing environment in accordance with an embodiment of the present disclosure.

FIG. 2 illustrates an example of a physical layout of a computing environment in accordance with an embodiment of the present disclosure. Referring now to FIG. 2, a computing environment 200 (referred to generally as cloud 200) may include one or more server systems 100 that may include one or more electronic computing devices configured to receive, transmit, process, and store data. For example, the servers in the cloud 200 may include one or more general-purpose personal computers, workstations, server computers, server pools, or any other suitable devices. In certain embodiments, the cloud 200 may include a web server. In short, the cloud 200 may include any suitable combination of software, firmware, and hardware.

The cloud 200 may include a plurality of server systems 100 that are communicatively coupled via a network 122. The network 122 facilitates wireless and/or wireline communication, and may communicate using, for example, IP packets, Frame Relay frames, Asynchronous Transfer Mode (ATM) cells, voice, video, data, and other suitable information between network addresses. The network 122 may include one or more local area networks (LANs), radio access networks (RANs), metropolitan area networks (MANS), wide area networks (WANs), all or a portion of the global computer network known as the Internet, and/or any other communication system or systems at one or more locations. Although referred to herein as "server systems," it will be appreciated that any suitable computing device may be used.

As shown in FIG. 2, computer readable program code defining a scripting engine 230 is injected into a runtime environment of one or more applications hosted by each of the server systems 100. As discussed above with reference to FIG. 1, the scripting engine 230 may be configured to expose or otherwise provide access to the internal data of the applications, and to load one or more scripts for execution in the context of the existing code of the application. The injected scripting engine 230 may provide a platform to add functionalities and/or otherwise alter operation of the applications hosted by the computer systems 100, without modifying the existing code. For example, as described in greater detail below, scripts may be loaded by the scripting engine 230 to allow for discovery and communication between one or more applications executing on the various computer systems 100 via the network 122.

Figure 3:
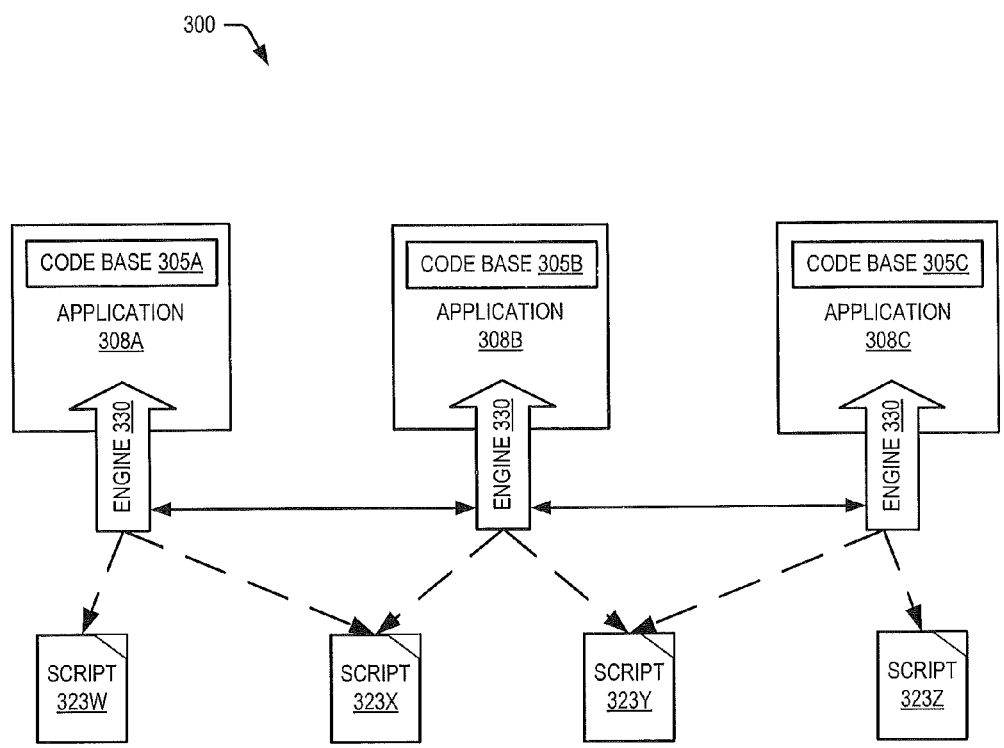
FIG. 3 is a block diagram illustrating systems and methods for communication with an existing code base of a software application in accordance with an embodiment of the present disclosure.

FIG. 3 is a block diagram illustrating systems and methods for communication with software applications or components having an existing code bases in accordance with an embodiment of the present disclosure. As shown in the example of FIG. 3, a computing environment 300 includes software applications or components 308A-308C. One or more of the applications 308A-308C may be implemented on a virtual machine, such as a Java Virtual Machine (JVM). A scripting engine 330 is injected into the runtime environment of each product 308A-308C. The scripting engine 300 exposes or otherwise provides access to internal data of each of the software applications 308A-308C. As the scripting engine 300 is introduced into the runtime environment using code injection, the exposing can be performed without utilizing an interface or protocol of the software components 308A-308C.

Still referring to FIG. 3, each injected engine 330 provides a platform for altering operation of the software applications 308A-308C, without modifying the existing code bases 305A-305C of the applications 308A-308C. In particular, injection of the scripting engine 330 provides an interface (such as a HTTP interface) into the respective environments of each of the application 308A-308C. As such, in accordance with the exposed internal data, one or more scripts 323W-323Z can be written and loaded by the scripting engine 330. The scripts 323W-323Z may be written in a different programming language than that of the applications 308A-308C. For example, the applications 308A-308C may be based on a static language in which errors are detected at compilation, such as Java, while the scripts may be written in a dynamic language where errors are detected at runtime, such as JavaScript. The loaded script(s) 323W-323Z may thus be executed by the engine 330 in the context of the existing code 305A-305C of the software applications 308A-308C.

The scripts 323W-323Z may be configured to introduce various functionality that is not provided by the existing applications 308A-308C, and/or may access the existing subroutines/methods of the applications 308A, 308B, and/or 308C. For example, if application 308A includes a class called 'A.look.up,' then, upon loading an appropriate one of the scripts 323W-323Z, the scripting engine 330 could enumerate and call 'A.look.up.' The scripts 323W-323Z may also be updated to reflect changes in the existing applications 308A-308C and/or otherwise alter operation thereof without having to recompile the applications 308A-308C. For example, if (in an upgrade to application 308A) the call 'A.look.up' was deprecated or required extra parameters, a file associated with the script 323W could simply be updated to reflect this change, instead of having to recompile the application 308A. Also, to add a method to an object, a function call can be added to the respective code bases of one or more of the dynamic scripts 323W, 323X, 323Y, and/or 323Z. Likewise, to remove the function call, a plain text file of the dynamic scripts 323W, 323X, 323Y, and/or 323Z may be updated, without requiring repackaging or recompiling of the applications 308A, 308B, and/or 308C.

The scripting engine 330 is also configured to find other instances of the scripting engine 330 dynamically and/or in real-time. In particular, in the example of FIG. 3, the instance of the scripting engine 330 injected into the runtime environment of application 308A is configured to automatically discover the instances of the scripting engine 330 injected into the runtime environments of applications 308B and 308C, allowing for communication and interoperability between one or more otherwise unrelated software applications 308A-308C. For example, upon loading a corresponding one of the scripts 323W-323Z written to provide the desired functionality, a function call could be executed that took the results for the existing call 'A.look.up' of application 308A and combined the results with an existing call 'B.phone.num' of application 308B. More particularly, in an example where application 308A is an asset management tool and application 308B is a company directory tool, a script could be loaded and executed to take the results of an existing function call in application 308A to look up all assets on Floor 1, and combine these results with the results of an existing function call in application 308B to determine the phone numbers of the owners of each of the assets on Floor 1. In other words, the scripting engine 330 may be configured (upon loading of a script that provides the functionality) to provide an output of the execution on application 308A to the application 308B, and the application 308B may be configured to create a native call using the output.

Furthermore, as the scripting engine 330 is injected into multiple applications 308A-308C, a scriptable external call may be written. For example, a script may be loaded by the instance of the scripting engine 330 of application 308A that executes an external call to a function of application 308B. So, the scripting environment is not only limited to application 308A or application 308B or application 308C, but could contain calls to any or all three environments semi-transparently. In addition, as the scripting engine 330 is configured to allow the nodes 308A-308C to have knowledge of each other, scripts 323W-323Z that are written to run on application 308A could also be loaded and run on applications 308B and/or 308C with little to no modification.

Figure 4:
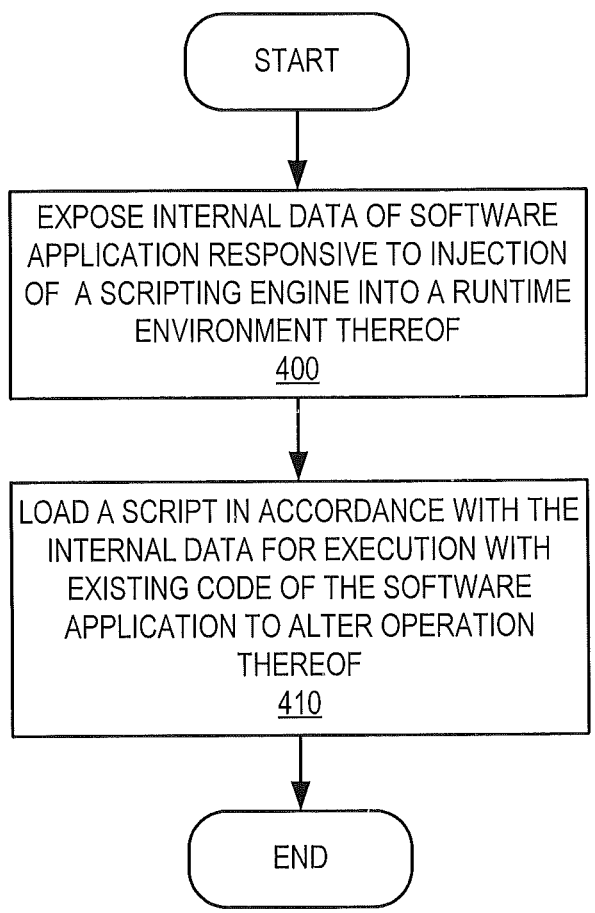
FIGS. 4-5 are flowcharts illustrating operations for communicating with an existing code base of a software application and related components in accordance with an embodiment of the present disclosure.

FIG. 4 is a flowchart illustrating methods of communication with an existing software application according to an embodiment of the present disclosure. Referring now to FIG. 4, in response to injection of computer readable program code defining a scripting engine into a runtime environment associated with the software application, internal data of the software application is exposed or otherwise made accessible at block 400. For example, as shown in FIG. 3, a scripting engine 330 may be injected into a software application 308A, and may expose or otherwise provide access to the methods, subroutines, objects, instances etc. of the application 308A. At block 410, additional computer readable program code defining a script is loaded for execution with existing code of the software application. The script is written and/or loaded based on or otherwise in accordance with the internal data of the software application. For example, for a web based banking application that is accessible via a HTML user interface, the scripting engine 330 may be able to hook the 'accounts' class and access internal data (such as a 'getBalance' method) in a programmatic fashion that can be consumed in other manners (e.g., independent of the HTML human consumable method of exposing information). The script is interpretable by the scripting engine, may be written in a different programming language than that upon which the software application is based, and may be configured to provide functionality that is not otherwise provided by the software application. For example, as shown in FIG. 3, a script 323W written in a dynamic programming language is loaded by the scripting engine 330 responsive to injection of the scripting engine 330 into application 308A, which is based on a static language. The script may then be interpreted by the scripting engine and executed in the context of the existing code of the software application. In particular, in the example of FIG. 3, the script 323W is interpreted by the scripting engine 330, and the result is compiled and executed by a machine hosting the application 308A along with the existing code 305A of the application 308A. As such, the behavior or other operation of the application 308A is altered without modifying the existing code base 305A.

Figure 5:
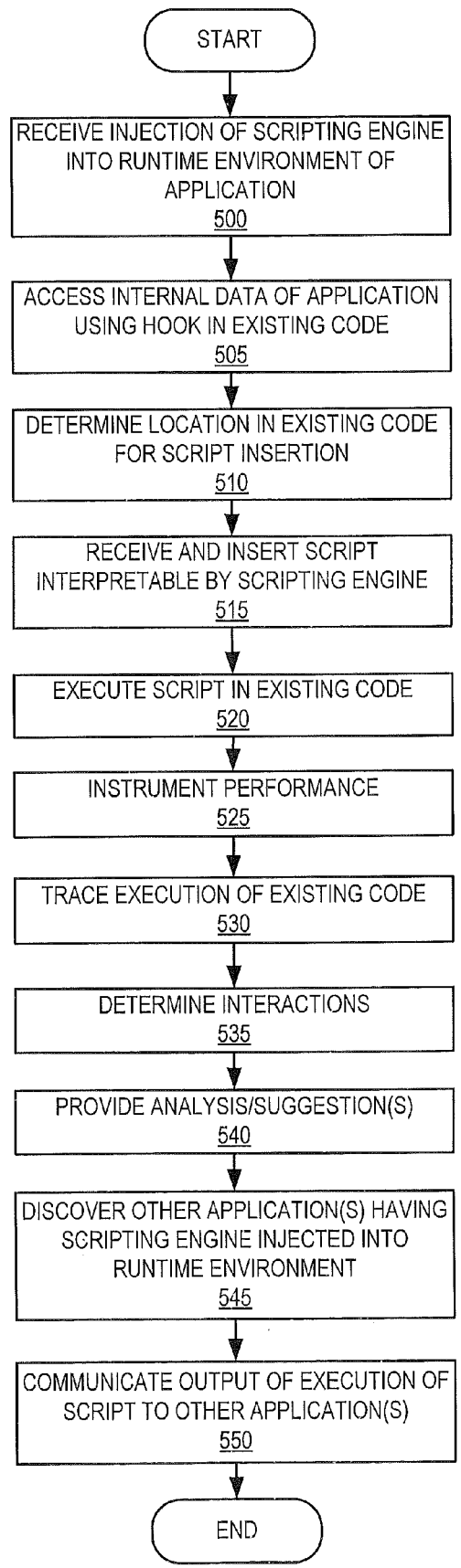

FIG. 5 is a flowchart illustrating methods of communication between computing nodes in a distributed computing system according to the embodiment of FIG. 3 in greater detail. Referring now to FIG. 5, computer readable program code defining a scripting engine 330 is received via code injection into a runtime environment of software application 308A at block 500. In particular, as shown in FIG. 3, the scripting engine 330 is injected into runtime environments of multiple software applications 308A-308C, which in the current example are Java applications hosted by respective Java virtual machines (JVMs). Internal data of the software application 308A is accessed using a hook in its existing code 305A at block 505. Based on the internal data, a location in the existing code 305A for insertion of a script is determined at block 510. At block 515, a script 323W is received and loaded/inserted into the existing code 305A at the location that was determined in block 510. The script 323W is written in a dynamic programming language (in contrast to the static programming language of the Java application 308A), and is configured to provide at least one function that is not currently provided by the application 308A. In particular, in the present example, the script 323W represents multiple scripts that provide instrumentation, code tracing, analysis, and inter-product communication functions.

The script 323W is interpreted by the scripting engine 330, which is converted into Java bytecode and executed by the JVM that is hosting application 308A in a context of the existing code 305A at block 520. Responsive to execution of the script 323W, the performance of the software application 308A is instrumented at block 525, and the execution of the existing code 305A is traced at block 530. For example, the instrumenting and tracing may record and output logging information about the execution of the software application 308A at runtime. Interaction(s) of one or more function calls and method calls in the existing code 305A is determined at block 535, and analysis/suggestions based on the determined interactions are provided at block 540. For example, the analysis may result in suggestions with respect to integration, performance issues, and/or potential bugs relating to application 308A.

Still referring to FIG. 5, responsive to execution of the script, one or more other software applications 308B and/or 308C having instances of the scripting engine 330 injected into their respective runtime environments are dynamically discovered at block 545. As such, at least one output of the execution of the script 323W is communicated to the other software applications 308B and/or 308C at block 550. For example, a result of the pre-existing or new function provided by the script 323W may be transmitted to the application 308B for use thereby. Additionally or alternatively, a function call to a pre-existing or new function of the application 308B may be communicated to the application 308B responsive to execution of the script 323W. As such, based on injection of the scripting engine 330, the applications 308A-308C may be provided with new functionality and/or interoperability without altering or modifying the existing code bases 305A-305C.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

In the drawings and specification, there have been disclosed typical embodiments and, although specific terms are employed, they are used in a generic and descriptive sense only and not for purposes of limitation, the scope of the invention being set forth in the following claims.

The invention claimed is:

1. A method of communicating with a software application, the method comprising:
   exposing internal data of the software application responsive to code injection of computer readable program code comprising a scripting engine into a runtime environment associated with the software application, wherein the code injection allows execution of code based on a different programming language than the software application and the scripting engine comprises an interpreter written in a same programming language as the software application; and
   loading computer readable program code comprising a script in accordance with the internal data that was exposed, wherein the script is based on a different programming language than the software application and is interpretable by the scripting engine for execution with existing code of the software application to alter operation thereof,
   wherein the exposing and the loading comprise operations performed by at least one processor.

2. The method of claim 1, wherein the exposing is performed without utilizing an application program interface of the software application.

3. The method of claim 2, wherein exposing comprises:
   accessing the internal data using a hook in the existing code; and
   determining, based on the internal data, a location in the existing code to insert the script,
   and wherein loading comprises:
   inserting the script into the existing code at the location.

4. The method of claim 2, further comprising:
   executing the script in a context of the existing code to provide a functionality different from the software application without modification of the existing code.

5. The method of claim 2, wherein the software application is free of a scripting environment for execution of the script prior to the code injection of the scripting engine.

6. The method of claim 5, wherein the software application is based on a static programming language, and wherein the script is based on a dynamic programming language.

7. The method of claim 1, wherein the software application is a first software application, the method further comprising:
   discovering a second software application having the computer readable program code comprising the scripting engine injected into a runtime environment thereof; and
   providing an output of the execution to the second software application.

8. The method of claim 7, wherein the output of the execution comprises an external call to the second software application.

9. The method of claim 1, further comprising:
   updating a file of the script to alter operation thereof without recompiling the software application.

10. The method of claim 1, wherein the software application is hosted by a virtual machine, and wherein the execution comprises conversion of the scripting engine to machine-readable program code for execution by the virtual machine in a context of the existing code.

11. A computer program product, comprising:
    a non-transitory computer readable storage medium having computer readable program code comprising a scripting engine embodied in the medium, the computer readable program code comprising:
    computer readable program code to expose internal data of a software application responsive to code injection of the scripting engine into a runtime environment associated with the software application, wherein the code injection allows execution of code based on a different programming language than the software application and the scripting engine comprises an interpreter written in a same programming language as the software application; and
    computer readable program code to load a script in accordance with the internal data that was exposed, wherein the script is based on a different programming language than the software application and is interpretable by the scripting engine for execution with existing code of the software application to alter operation thereof.

12. The computer program product of claim 11, wherein the computer readable program code is to expose the internal data without utilizing an application program interface of the software application.

13. The computer program product of claim 12, wherein the computer readable program code to expose comprises:
    computer readable program code to access the internal data using a hook in the existing code; and
    computer readable program code to determine, based on the internal data, a location in the existing code to insert the script,
    and wherein the computer readable program code to load comprises:
    computer readable program code to insert the script into the existing code at the location.

14. The computer program product of claim 12, wherein execution of the script provides a functionality that is not provided by the software application without modification of the existing code.

15. The computer program product of claim 12, wherein the software application is free of a scripting environment for execution of the script prior to the code injection of the scripting engine.

16. The computer program product of claim 15, wherein the software application is based on a static programming language, and wherein the script is based on a dynamic programming language.

17. The computer program product of claim 11, wherein the software application is a first software application, and further comprising:
    computer readable program code to discover a second software application having the scripting engine injected into a runtime environment thereof,
    wherein the script comprises computer readable program code to provide an output of the execution to the second software application.

18. A computer system, comprising:
    at least one processor; and
    at least one memory coupled to the at least one processor, the at least one memory comprising computer readable program code embodied therein that, when executed by the at least one processor, causes the at least one processor to:
    expose internal data of a software application responsive to code injection of a scripting engine into a runtime environment associated with the software application, wherein the code injection allows execution of code based on a different programming language than the software application and the scripting engine comprises an interpreter written in a same programming language as the software application; and load a script in accordance with the internal data that was exposed, wherein the script is based on a different programming language than the software application and is interpretable by the scripting engine for execution with existing code of the software application to alter operation thereof.

19. The computer system of claim 18, wherein the computer readable program code causes the at least one processor to expose the internal data without utilizing an application program interface of the software application.

20. The computer system of claim 19, wherein the memory further comprises computer readable program code that, when executed by the at least one processor, causes the at least one processor to:

execute the script in a context of the existing code to provide a functionality that is not provided by the software application without modification of the existing code.

21. The computer system of claim 20, wherein the computer system comprises a virtual machine to host the software application, and wherein the computer readable program code causes the at least one processor to:

convert the scripting engine to machine-readable program code for execution by the virtual machine in the context of the existing code.

22. The computer system of claim 20, wherein the software application is free of a scripting environment for execution of the script prior to the code injection of the scripting engine.

23. The computer system of claim 22, wherein the software application is based on a static programming language, and wherein the script is based on a dynamic programming language.

24. The computer system of claim 20, wherein the computer readable program code causes the at least one processor to:

discover a second software application having the scripting engine injected into a runtime environment thereof; and provide an output of the execution to the second software application.

* * * * *